(12) United States Patent
Trybuła et al.

(10) Patent No.: US 10,738,837 B2
(45) Date of Patent: Aug. 11, 2020

(54) TORQUE LIMITER ASSEMBLY

(71) Applicant: Hamilton Sundstrand Corporation, Charlotte, NC (US)

(72) Inventors: Daniel Trybuła, Wroclaw (PL); Maciej Sobieszek, Wroclaw (PL)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 25 days.

(21) Appl. No.: 16/029,735

(22) Filed: Jul. 9, 2018

(65) Prior Publication Data

US 2019/0017553 A1 Jan. 17, 2019

(30) Foreign Application Priority Data

Jul. 13, 2017 (EP) .................................... 17461567

(51) Int. Cl.

| | | |
|---|---|---|
| *F16D 7/04* | (2006.01) | |
| *F16D 43/20* | (2006.01) | |
| *F16D 7/10* | (2006.01) | |
| *F16D 41/067* | (2006.01) | |
| *F16D 41/08* | (2006.01) | |
| *F16D 41/02* | (2006.01) | |
| *F16D 43/202* | (2006.01) | |
| *F16D 43/208* | (2006.01) | |

(52) U.S. Cl.
CPC ............... *F16D 7/044* (2013.01); *F16D 7/10* (2013.01); *F16D 41/02* (2013.01); *F16D 41/067* (2013.01); *F16D 41/088* (2013.01); *F16D 43/20* (2013.01); *F16D 43/208* (2013.01); *F16D 43/2024* (2013.01)

(58) Field of Classification Search
None
See application file for complete search history.

(56) References Cited

U.S. PATENT DOCUMENTS

| | | |
|---|---|---|
| 3,205,985 A | 9/1965 | Pearl |
| 3,640,092 A | 2/1972 | Neal et al. |
| | (Continued) | |

FOREIGN PATENT DOCUMENTS

| | | |
|---|---|---|
| GB | 1208958 A | 10/1970 |
| GB | 1333153 A | 10/1973 |

OTHER PUBLICATIONS

Extended European Search Report for International Application No. 17461567.4 dated Jan. 24, 2018, 7 pages.

*Primary Examiner* — Colby M Hansen
(74) *Attorney, Agent, or Firm* — Cantor Colburn LLP

(57) ABSTRACT

A torque limiting assembly is disclosed comprising: an input shaft; an output shaft; a drive bush; a motion converter mechanism; a casing; and at least one engagement member for engaging the casing. In a low torque mode, rotation of the input shaft drives rotation of the drive bush, motion converter mechanism and output shaft. In a high torque mode, rotation of the motion converter mechanism relative to the output shaft urges the motion converter mechanism axially to drive rotation of the drive bush relative to the input shaft. The engagement member is coupled to both the drive bush and the input shaft such that when the drive bush is rotated relative to the input shaft, the engagement member is urged to engage the casing so as to prevent or inhibit rotation of the input shaft relative to the casing.

16 Claims, 6 Drawing Sheets

(56) References Cited

U.S. PATENT DOCUMENTS

| | | | | |
|---|---|---|---|---|
| 3,967,711 | A | * | 7/1976 | Stroezel .................. F16D 7/044 |
| | | | | 192/108 |
| 4,856,632 | A | * | 8/1989 | Stieger ................ F16D 43/2024 |
| | | | | 192/56.32 |
| 5,616,080 | A | * | 4/1997 | Miescher .............. F16D 43/208 |
| | | | | 192/56.1 |
| 5,901,817 | A | | 3/1999 | Gitnes |
| 6,799,858 | B1 | * | 10/2004 | Boegelein ............... B60R 1/074 |
| | | | | 359/841 |
| 8,382,595 | B2 | * | 2/2013 | Lonergan, III ......... F16D 3/227 |
| | | | | 464/38 |
| 8,967,004 | B2 | | 3/2015 | Palfai et al. |
| 9,441,677 | B2 | | 9/2016 | Williams et al. |

* cited by examiner

TORQUE LIMITER ASSEMBLY

FOREIGN PRIORITY

This application claims priority to European Patent Application No. 17461567.4 filed Jul. 13, 2017, the entire contents of which is incorporated herein by reference.

FIELD

The present disclosure relates generally to assemblies for limiting the amount of torque in a system where an input shaft drives an output shaft.

BACKGROUND

Torque limiting apparatus are known in which the input shaft is prevented from rotating if the torque in the system becomes excessive due to mechanical overloading. These apparatus are used to protect mechanical equipment from damage caused by excessive torque.

A known type of torque limiting apparatus comprises a torsion bar that transmits the turning force (torque) from the input shaft to the output shaft, so that rotation of the input shaft drives a corresponding rotation of the output shaft. If there is excessive resistance to rotation of the output shaft due to mechanical overloading, then the input shaft forces the torsion bar to twist, enabling the input shaft to rotate relative to the output shaft. The torque limiting apparatus is configured such that this relative rotation urges rollers, which are coupled to the input shaft, into contact with a surrounding casing, thereby preventing rotation of the input shaft relative to the casing and hence preventing further torque being applied to the output shaft.

SUMMARY

The present disclosure provides a torque limiting assembly comprising: an input shaft; an output shaft; a drive bush; a motion converter mechanism; a casing; and at least one engagement member for engaging the casing; wherein the input shaft is coupled to the drive bush, and the drive bush is coupled to the output shaft by the motion converter mechanism such that, in a low torque mode, rotation of the input shaft drives rotation of the drive bush, motion converter mechanism and output shaft; and wherein the output shaft and the motion converter mechanism are coupled such that, in a high torque mode, rotation of the motion converter mechanism relative to the output shaft about an axis of rotation urges the motion converter mechanism in a direction along the axis of rotation, wherein the motion converter mechanism and drive bush are coupled such that when the motion converter mechanism is urged along said axis of rotation the motion converter mechanism rotates the drive bush relative to the input shaft; and wherein the engagement member is coupled to both the drive bush and the input shaft such that when the drive bush is rotated relative to the input shaft, the engagement member is moved or urged to engage the casing so as to prevent or inhibit rotation of the input shaft relative to the casing.

In use, the input shaft is driven to rotate, e.g. by a motor. It will be appreciated that the low torque mode occurs when there is relatively low resistance to rotation of the output shaft and the high torque mode occurs when there is relatively high resistance to rotation of the output shaft.

The motion conversion mechanism may comprise a rotational-to-linear motion converter and a linear-to-rotational converter.

One of the output shaft and the motion converter mechanism may comprise a first protrusion and the other of the output shaft and motion converter mechanism may comprise a first channel in which the protrusion is located. The first protrusion and first channel may be arranged and configured such that, in the high torque mode, said rotation of the motion converter mechanism relative to the output shaft urges the motion converter mechanism in a direction along the axis of rotation.

The motion converter mechanism may be moved along the axis of rotation towards the drive bush.

The first protrusion may be arranged on a circumferential exterior surface of the output shaft. The first channel may be arranged in the circumferential interior surface of the motion converter mechanism. It is alternatively contemplated that the output shaft may comprise the first channel (on an exterior or interior surface) and the motion converter mechanism may comprise the first protrusion (on an interior or exterior surface).

One of the drive bush and the motion converter mechanism may comprise a second protrusion and the other of the drive bush and the motion converter mechanism may comprise a second channel in which the second protrusion is located. The second protrusion and second channel may be arranged and configured such that, in the high torque mode, when the motion converter mechanism is urged in a direction along said axis of rotation the motion converter mechanism rotates the drive bush relative to the input shaft.

The motion converter mechanism may be moved along the axis of rotation and along the drive bush so as to rotate the drive bush.

The second protrusion may be arranged on a circumferential exterior surface of the drive bush. The second channel may be arranged in the circumferential interior surface of the motion converter mechanism. It is alternatively contemplated that the drive bush may comprise the second channel (on an exterior or interior surface) and the motion converter mechanism may comprise the second protrusion (on an interior or exterior surface).

The first channel and/or first protrusion may be elongated and extend both around and along the axis of rotation; and/or the second channel and/or second protrusion may be elongated and extend both around and along the axis of rotation.

The first protrusion may form part of a helix around the output shaft and/or the first channel may form part of a helix around the motion converter mechanism.

The second protrusion may form part of a helix around the drive bush and/or the second channel may form part of a helix around the motion converter mechanism.

The first and second protrusions may form parts of helices that are helical in opposite directions around an axis; and/or the first and second channels may form parts of helices that are helical in opposite directions around an axis.

The motion converter mechanism may comprise a first portion engaged with the output shaft, a second portion engaged with the drive bush, and a resilient biasing member arranged between the first and second portions for resisting movement of the first and second portions towards each other along the axis of rotation, and thereby resisting rotation of the motion converter mechanism relative to the output shaft.

In the low torque mode the engagement between the drive bush and the motion converter mechanism is configured to transform the rotational force from the drive bush into an axial force towards the output shaft, and the engagement between the motion converter mechanism and the output shaft is configured to transform the axial force to a rotational force to rotate the output shaft.

In the high torque mode the engagement between the output shaft and the motion converter mechanism is configured to transform the relative rotation therebetween into an axial force towards the drive bush, and the engagement between the motion converter mechanism and the drive bush is configured to transform this axial force to a rotational force to rotate the drive bush relative to the input shaft.

The resilient biasing member may be configured such that in the low torque mode it is compressed by a relatively low amount such that there is a relatively low amount of rotation of the motion converter mechanism relative to the output shaft; and the resilient biasing member may be configured such that in the high torque mode it is compressed by a relatively high amount such that there is a relatively high amount of rotation of the motion converter mechanism relative to the output shaft.

In the low torque mode there may be no rotation of the motion converter mechanism relative to the output shaft and/or substantially no compression of the resilient biasing member.

In the low torque mode, the engagement member is not moved or urged to engage the casing and does not prevent or significantly inhibit rotation of the input shaft relative to the casing.

The resilient biasing member may be arranged between the first and second portions for biasing the first and second portions away from each other along the axis of rotation, and the assembly may further comprise a movement limiting member for limiting the maximum amount of movement of the first and second portions away from each other. This allows the resilient biasing member to be preloaded so that it has a pre-selected resistance to compression and hence a preselected level of torque at which the assembly switches from the low torque mode to the high torque mode.

The movement limiting member may be selectively adjustable for selectively adjusting the maximum amount of movement of the first and second portions away from each other.

This allows the torque level at which the assembly switches from the low torque mode to the high torque mode to be adjusted.

The resilient biasing member may be a spring.

However, it is contemplated that other forms of resilient biasing member may be used, such as materials that themselves inherently have resilient biasing properties (e.g. elastic properties), rather than being formed into a structure that is resiliently biasing.

The resilient biasing member may be an annular member arranged around the input shaft.

The input shaft may be coupled to the drive bush by an intermediate bush, wherein the input shaft comprises first teeth engaged with second teeth on the intermediate bush and the intermediate bush comprises third teeth engaged with fourth teeth on the drive bush.

Backlashes may be arranged between the first and second teeth and/or between the third and fourth teeth, thereby allowing the input shaft to drive the drive bush in the low torque mode and allowing rotation of the drive bush relative to the input shaft in the high torque mode.

The provision of the intermediate bush enables the backlashes between each pair of cooperating teeth to be made smaller, whilst still allowing sufficient relative rotation of the components when switching between the low and high torque modes. However, it is contemplated that the intermediate bush may not be provided and that the teeth on the input shaft may directly engage the teeth on the drive bush, with the backlashes being between these sets of teeth.

In the low torque mode the input shaft may drive the intermediate bush, which may drive the drive bush. In the high torque mode, the drive bush may drive the intermediate bush to rotate relative to the input shaft.

The intermediate bush may contact the engagement member so that rotation of the intermediate bush causes a corresponding rotation of the engagement member.

The input shaft may comprise a portion in contact with the engagement member that is curved or otherwise ramped in a circumferential direction; and the assembly may be configured such that rotation of the drive bush relative to the input shaft, in the high torque mode, forces said engagement member along the curved or ramped surface and moves or urges the engagement member radially outwards to engage the casing so as to prevent or inhibit rotation of the input shaft relative to the casing.

In embodiments comprising the intermediate bush, the intermediate bush may be arranged concentrically with, and between, at least a portion of the input shaft and at least a portion of the casing. The portion of the intermediate bush may comprise an aperture in which the engagement member is arranged, wherein the aperture is sized and configured to contain the engagement so that rotation of the intermediate bush causes a corresponding rotation of the engagement member.

Although a mechanism of using ramped surfaces has been described for moving or urging the engagement member to engage the casing (so as to prevent or inhibit rotation of the input shaft relative to the casing), it will be appreciated that other mechanisms may be used for converting relative rotational movement into radial movement of the engagement member.

The torque limiting assembly may have an outer housing and the casing may be part of the housing, or may be a separate member within the housing.

The engagement member may be a roller.

Embodiments disclosed herein automatically switch from the low torque mode to the high torque mode when the torque rises to a predetermined level. Optionally, the torque limiting assembly may automatically switch from the high torque mode to the low torque mode when the torque drops to a predetermined level.

The torque limiting assembly may form part of an actuator, such as an actuator in secondary flight control. The torque limiting assembly may form part of a flight control actuation system in order to prevent overload of the actuation system at the output shaft. For example, the torque limiting assembly may be used in planetary geared actuators in flight control actuation systems. The torque limiting assembly may form part of a high-lift system actuator.

BRIEF DESCRIPTION OF THE DRAWINGS

Various embodiments will now be described, by way of example only, and with reference to the accompanying drawings in which.

DETAILED DESCRIPTION

Figure 1:
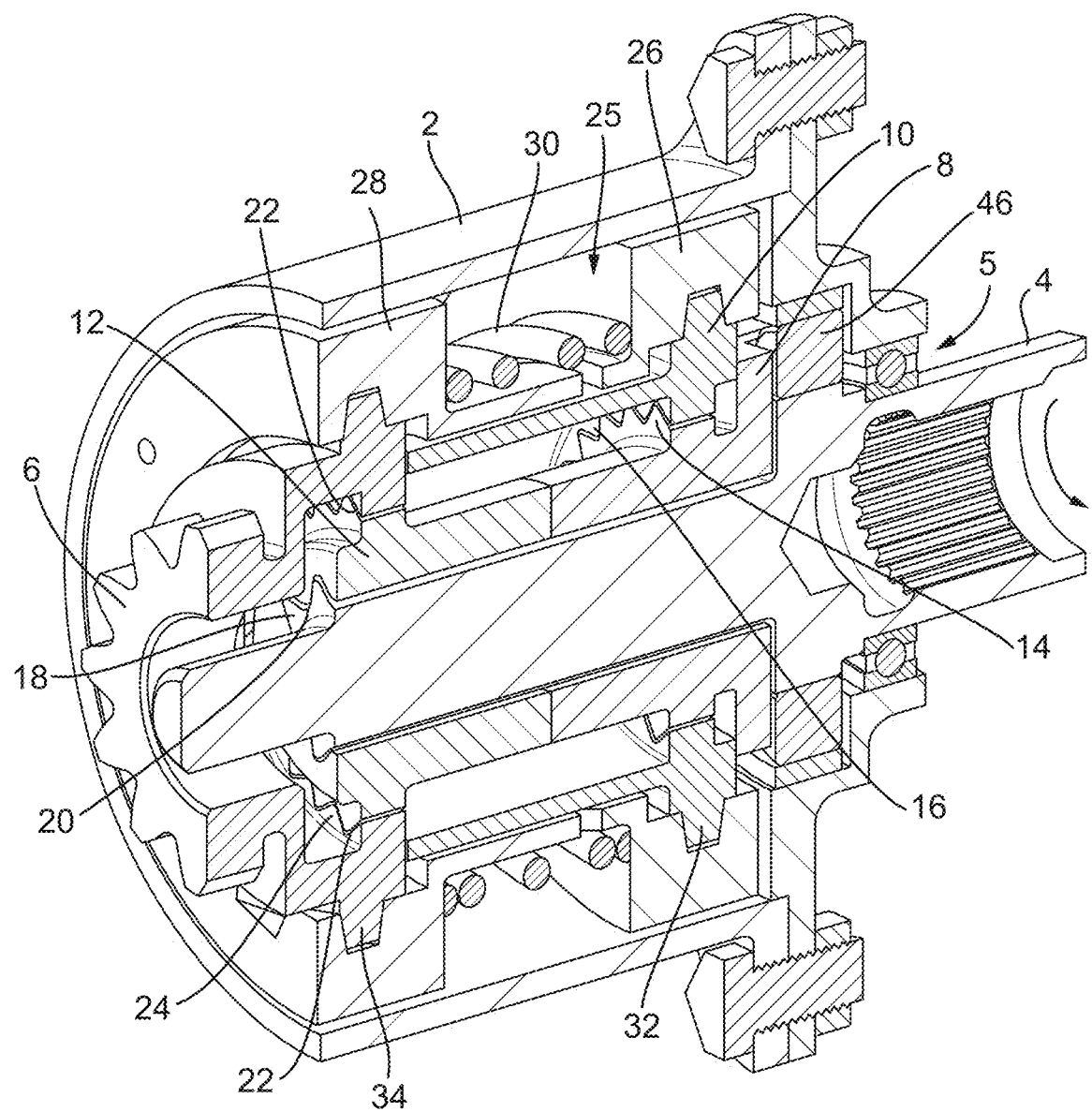
FIG. 1 shows a perspective sectional view of a torque limiting assembly according to an embodiment of the present disclosure.

FIG. 1 shows a schematic sectional view of a torque limiting assembly according to an embodiment of the present disclosure. The assembly comprises a housing 2, an input shaft 4, a bearing 5, an output shaft 6, a first bush 8 (an "intermediate bush"), a second bush 10 (a "drive bush"), and a third bush 12. The first bush 8 is arranged concentrically around the input shaft 4, towards a first end of the input shaft, and the second bush 10 is arranged concentrically around the first bush 8. The exterior surface of the input shaft 4 is splined so as to provide teeth (not shown) at the first end that are arranged circumferentially around the input shaft 4. The interior surface of the first bush 8 also comprises teeth (not shown) that engage with the teeth on the input shaft 4. The exterior surface of the first bush 8 comprises teeth 14 arranged circumferentially around it. The interior surface of the second bush 10 also comprises teeth 16 that engage with the teeth 14 on the exterior surface of the first bush 8.

The third bush 12 is arranged concentrically around the input shaft 4, towards a second end of the input shaft 4, and the output shaft 6 is arranged concentrically around the third bush 12. The exterior surface of the input shaft 4 is splined so as to provide teeth 18 arranged circumferentially around the input shaft 4. The interior surface of the third bush 12 also comprises teeth 20 that engage with the teeth 18 on the input shaft 4. The exterior surface of the third bush 12 comprises teeth 22 arranged circumferentially around it. The interior surface of the output shaft 6 also comprises teeth 24 that engage with the teeth 22 on the exterior surface of the third bush 12.

The assembly also comprises a motion converter mechanism 25 for urging the second bush 10 circumferentially in the opposite direction to the output shaft 6. This mechanism 25 comprises a first spring base 26, a second spring base 28 and a spring 30 arranged between the first and second spring bases for resisting movement of the spring bases 26,28 towards each other and for biasing these bases away from each other in the longitudinal direction of the assembly (i.e. in a direction along the axis of rotation of the input and output shafts). The first spring base 26 is arranged concentrically around the second bush 10 and engaged with two projections 32 extending radially therefrom. The second spring base 28 is arranged concentrically around the output shaft 6 and engaged with two projections 34 extending radially therefrom. The spring base 28 therefore forms a first portion of the motion converter mechanism 25 engaged with the output shaft 6, and the spring base 26 forms a second portion of the motion converter mechanism 25 engaged with the output shaft second bush (drive bush) 10. Although each of the second bush 10 and output shaft 6 are described as having two projections thereon, it is contemplated that only a single projection, or more than two projections, may be provided. The spring 30 may be a helical spring surrounding around the axes of rotation of the input and output shafts. Alternatively, it is contemplated that a spring (or another type of resilient biasing member) may be arranged between the spring bases 26,28 only at selected circumferential portions of the bases, rather than entirely surrounding the axes of rotation. A plurality of such springs (or other types of resilient biasing members) may be arranged between, and spaced circumferentially around, the spring bases 26,28.

Figure 2A:
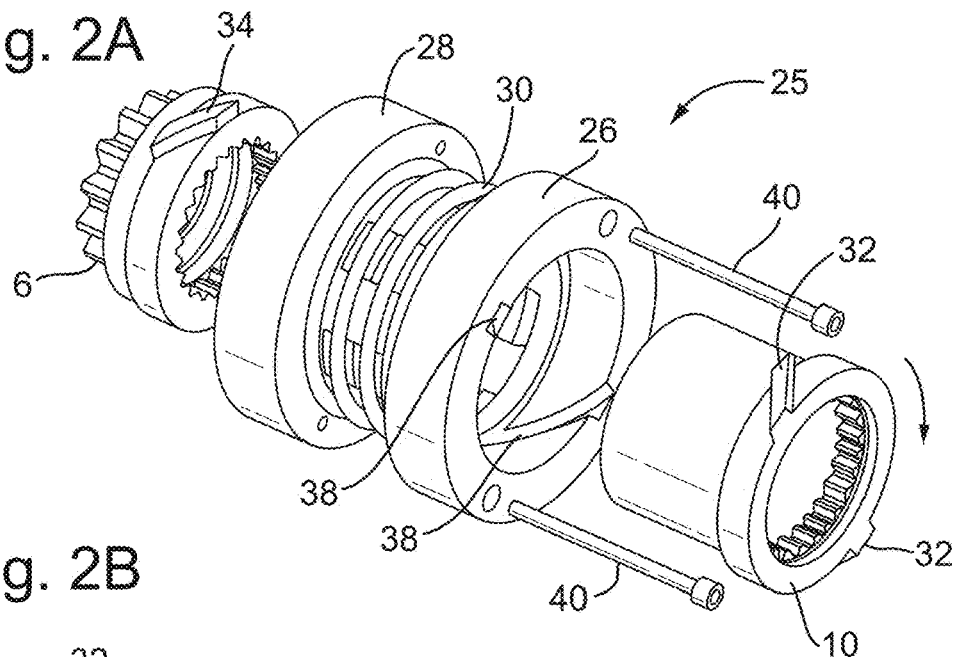
FIGS. 2A-2B show exploded views of the motion converter mechanism of the assembly in FIG. 1.
Figure 2B:
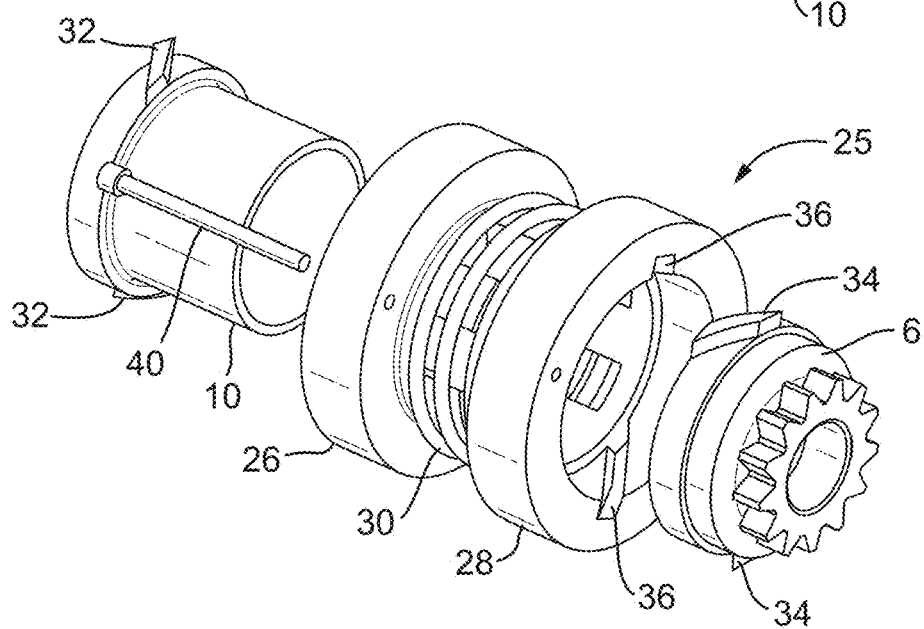

FIGS. 2A-2B show exploded views of the motion converter mechanism 25 with various components separated for ease of viewing. FIG. 2A shows the mechanism from a first angle and FIG. 2B shows the same mechanism from another angle. From these Figures it can be seen that each of the radial projections 34 on the output shaft 6 is elongated, extending along the exterior surface of the output shaft 6 at an angle to the circumferential direction and at an angle to the axis of rotation of the output shaft 6, e.g. in a helical manner. From FIG. 2B it can be seen that the second spring base 28 has complementally recessed channels 36 arranged in its interior surface and configured to receive the protrusions 34. The protrusions 34 and channels 36 are configured such that rotation of the second spring base 28 in a first direction relative to the output shaft 6, causes the second spring base 28 to move in a direction towards the first spring base 26.

It can also be seen that each of the radial projections 32 on the second bush 10 is also elongated, extending along the exterior surface of the second bush 10 at an angle to the circumferential direction and at an angle to the axis of rotation of the input shaft 4 (and output shaft 6), e.g. in a helical manner. The protrusions 32 on the second bush 10 may be symmetrical relative to the protrusions 34 on the output shaft 6 (about a plane orthogonal to the axis of rotation and arranged between the output shaft 6 and second bush 10). From FIG. 2A it can be seen that the first spring base 26 has complementally recessed channels 38 arranged in its interior surface and configured to receive the protrusions 32. The protrusions 32 and channels 38 are configured such that movement of the first spring base 26 along the axis of rotation towards the second bush 10, causes the second bush 10 to be urged in the first rotational direction (shown by the arrow in FIG. 2A).

The motion converter mechanism 25 also comprises movement limiting members 40 (not shown in FIG. 1) for limiting the distance that the spring bases 26,28 are able to moved away from each other in the longitudinal direction by the spring 30. These movement limiting members 40 may be configured such that when the torque limiting assembly is assembled, the spring bases 26,28 are maintained at a certain distance apart by the movement limiting members 40 such that the spring 30 is preloaded, i.e. partially compressed, by a preselected amount. The movement limiting members 40 may be configured such that the distance, and hence preloading of the spring 30, may be selectively adjusted (e.g. after the torque limiting assembly has been assembled). For example, the movement limiting members 40 may be (regulation) bolts that can be screwed, or otherwise selectively moved, relative to the screw bases 26,28 so as to adjust the maximum spacing between the spring bases 26,28 allowed and hence change the level of preloading of the spring 30.

Figure 2C:
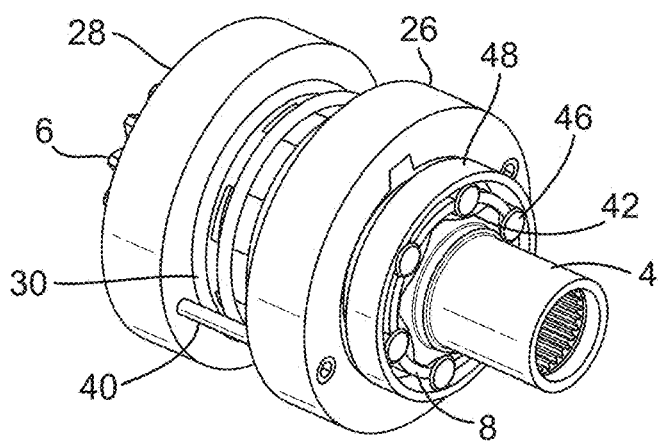
FIG. 2C shows a perspective view of part of the assembly of FIG. 1.

FIG. 2C shows the motion converter mechanism 25 when arranged in the torque limiting assembly, albeit with the housing 2 and bearing 5 removed for illustrative purposes only and so that the other components may be viewed more easily.

Figure 2D:
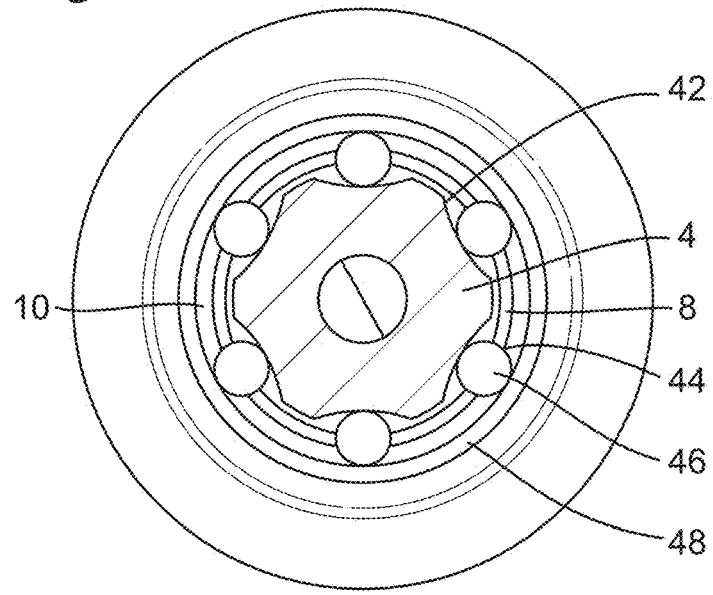
FIG. 2D shows a schematic of the assembly when viewed along the direction from the input shaft to the output shaft in a low torque mode.

FIG. 2D shows a schematic of the assembly when viewed along the direction from the input shaft 4 to the output shaft 6. As can be seen from FIGS. 2C and 2D, the input shaft 4 comprises a plurality of ramped portions 42 (e.g. forming a cam), in the form of wells, spaced circumferentially around the input shaft 4. The first bush 8 comprises a corresponding plurality of apertures 44 therethrough that are arranged at locations radially outward of the curved ramps 42 on the input shaft. An engagement member 46, which in this embodiment is in the form of a cylindrical roller member, is located sitting in each of the curved ramps 42 and also within the corresponding aperture 44 in the first bush 8. A casing 48 is arranged concentrically around the first bush 8. In the illustrated embodiment, the casing 48 is an independent member from the housing 2 and arranged therein. However, it is contemplated that in other embodiments the casing 48 may be part of the housing 2.

Figure 3A:
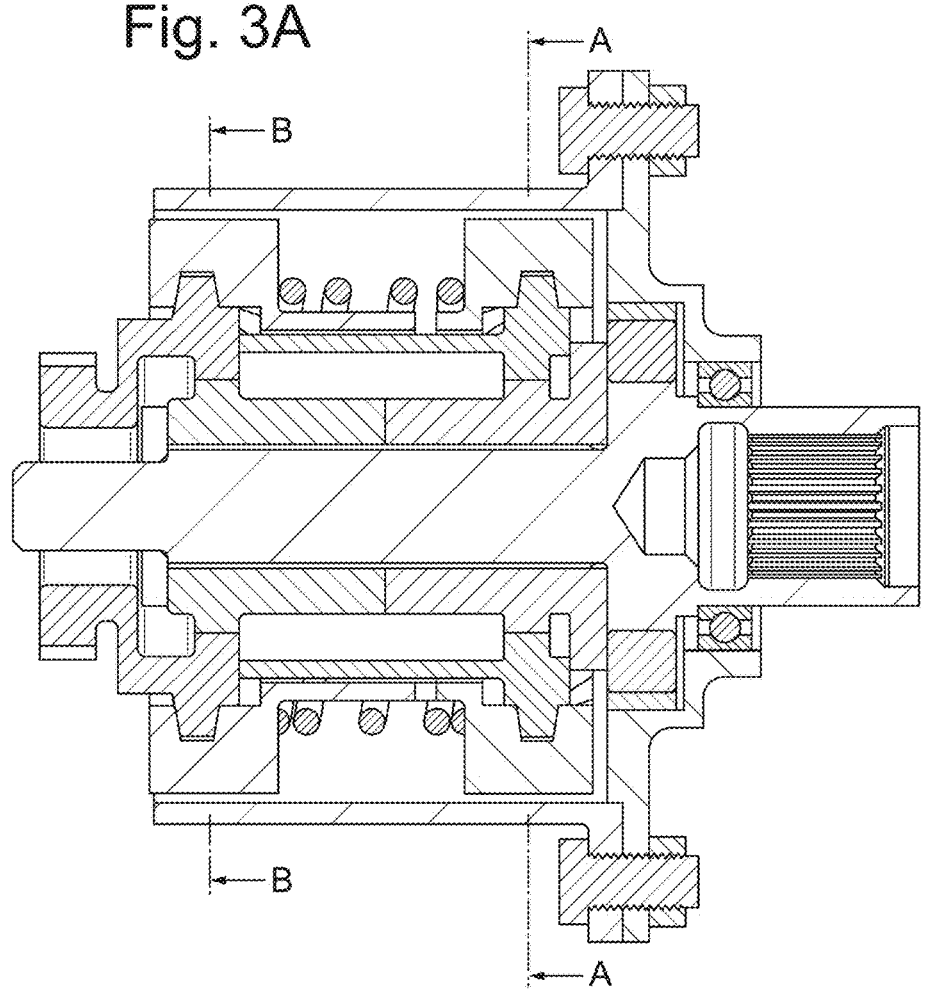
FIG. 3A shows a longitudinal sectional view of the assembly of FIG. 1.
Figure 3B:
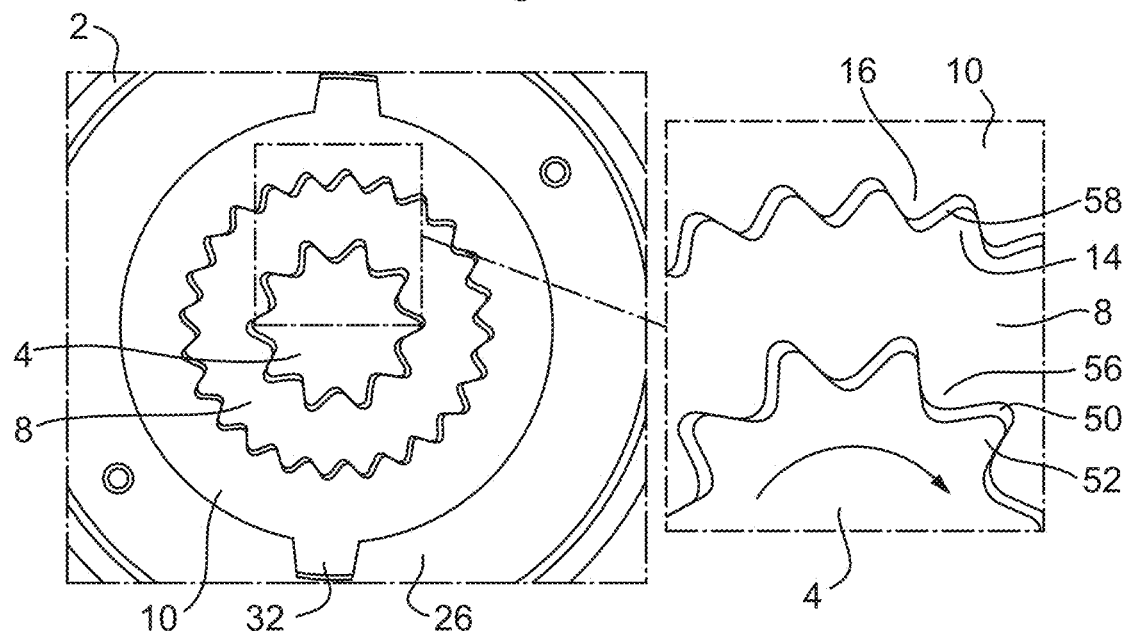
FIG. 3B shows a view along A-A in FIG. 3A during the low torque mode of operation.
Figure 3C:
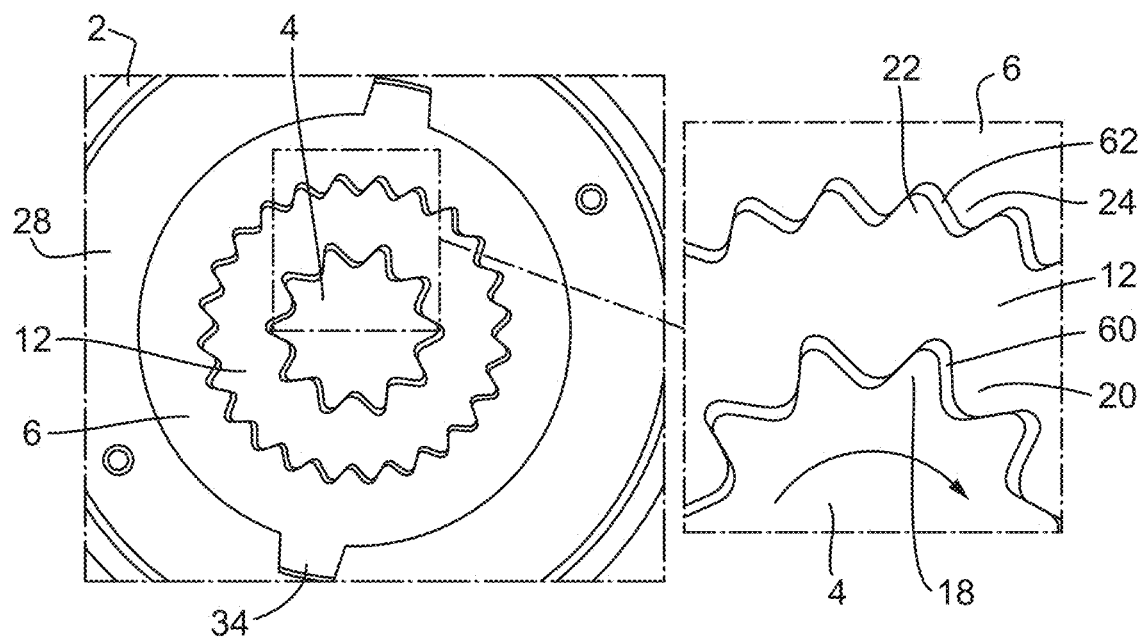
FIG. 3C shows a view along B-B in FIG. 3A during the low torque mode of operation.

FIG. 3A shows a longitudinal sectional view of the assembly. FIG. 3B shows a view along A-A in FIG. 3A during a normal (low torque) mode of operation and also shows an enlarged view of a portion of that view. It can be seen that there are relatively large gaps 50 (backlashes) between the teeth 52 of the input shaft 4 and the cooperating teeth 56 on the interior side of the first bush 8, and that there are relatively large gaps 58 (backlashes) between the teeth 14 of the exterior side of the first bush 8 and the cooperating teeth 16 on the interior side of the second bush 10. FIG. 3C shows a view along B-B in FIG. 3A during a normal (low torque) mode of operation and also shows an enlarged view of a portion of that view. It can be seen that there are relatively large gaps 60 (backlashes) between the teeth 18 of the input shaft 4 and the teeth 20 on the interior side of the third bush 12, and that there are relatively large gaps 62 (backlashes) between the teeth 22 of the exterior side of the third bush 20 and the teeth 24 on the interior side of the output shaft 6.

Figure 4A:
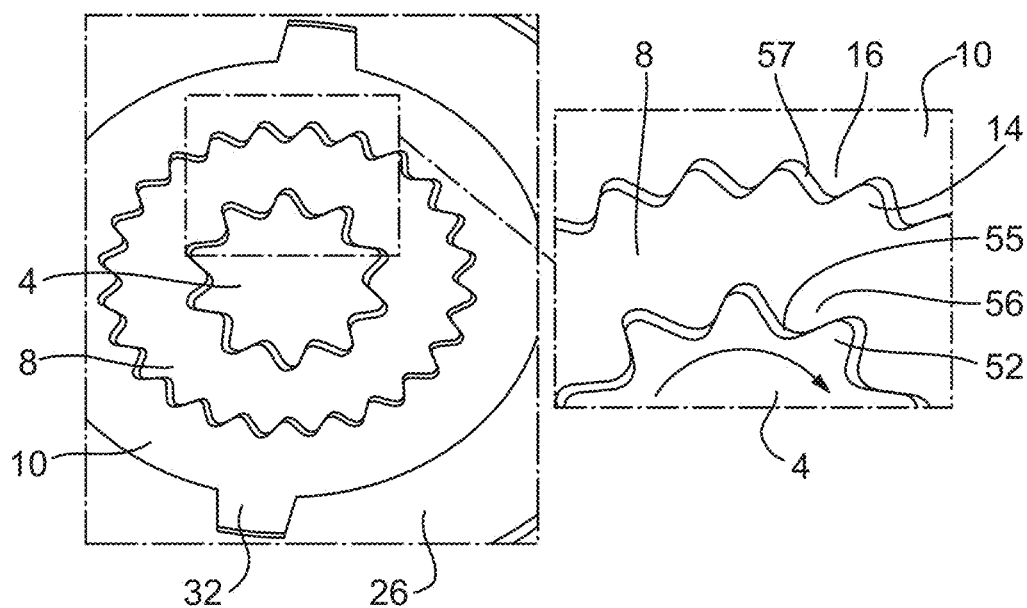
FIG. 4A shows a view along A-A in FIG. 3A during a high torque mode of operation.
Figure 4B:
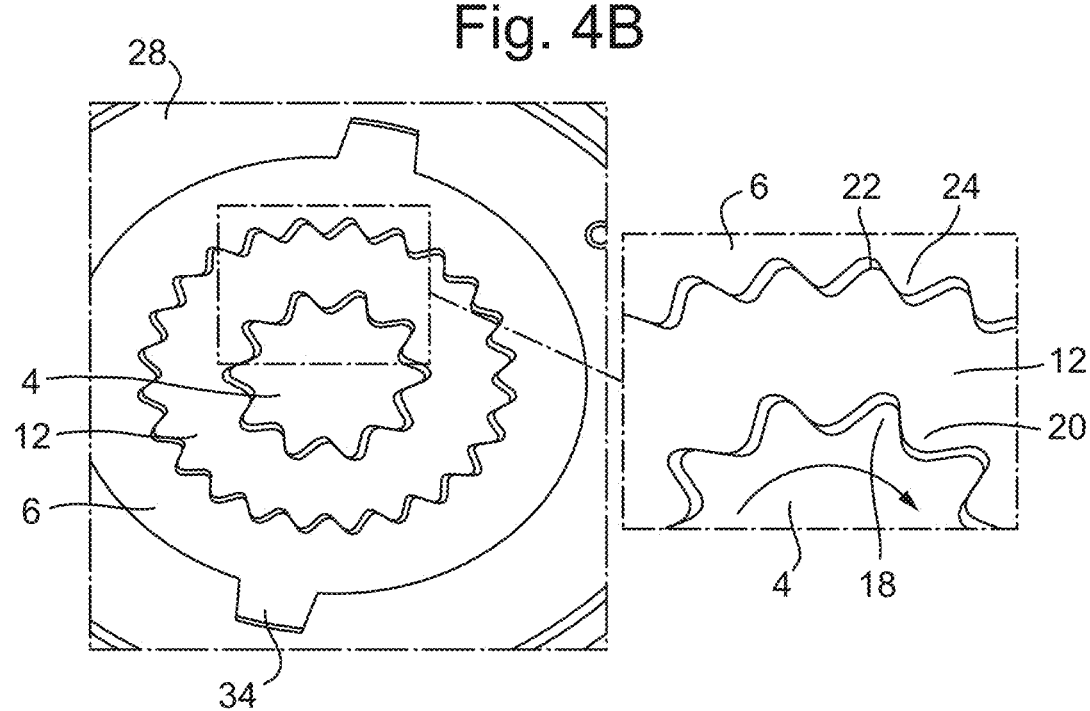
FIG. 4B shows a view along B-B in FIG. 3A during a high torque mode of operation.

FIG. 4A shows a view along A-A in FIG. 3A during a high torque mode of operation, and FIG. 4B shows a view along B-B in FIG. 3A during a high torque mode of operation.

The operation of the torque limiting assembly will now be described. The input shaft 4 may be rotated about its longitudinal axis in a first direction, as shown by the arrow in FIGS. 1 and 3B-3C. In a normal mode of operation (a low torque mode of operation) there is relatively little resistance to rotation of the output shaft 6 in the first direction. As shown in FIG. 3B, the front sides of the teeth 52 on the external surface of the input shaft 4 push against the rear sides of the teeth 56 on the internal surface of the first bush 8, leaving gaps 50 (backlashes) between the rear sides of the teeth 52 on the input shaft 4 and the front sides of the teeth 56 on the first bush 8. In turn, the front sides of the teeth 14 on the external surface of the first bush 8 push against the rear sides of the teeth 16 on the internal surface of the second bush 10, leaving gaps 58 (backlashes) between the rear sides of the teeth 14 on the first bush 8 and the front sides of the teeth 16 on the second bush 10. The first and second bushes 8,10 are therefore rotated in the first direction by the input shaft 4.

Referring to FIG. 2A, the rotation of the second bush 10 in the first direction causes the first spring base 26 to also rotate in first direction, since the protrusions 32 on the second bush 10 push on the channels 38 in the first spring base 26. The movement limiting members 40 couple the first and second spring bases 26,28 and therefore the second spring base 28 is also driven to rotate in the first direction. Rotation of the second spring base 28 causes output shaft 6 to rotate in the first direction, since the channels 36 on the second spring base 28 push on the corresponding protrusions 34 on the output shaft 6.

Referring to FIG. 3C, the front sides of the teeth 24 on the internal surface of the output shaft 6 push against the rear sides of the teeth 22 on the external surface of the third bush 12, leaving gaps 62 (backlashes) between the rear sides of the teeth 24 on the output shaft and the front sides of the teeth 22 on the third bush 12. In turn, the front sides of the teeth 20 on the internal surface of the third bush 12 are against the rear sides of the teeth 18 on the external surface of input shaft 4, leaving gaps 60 (backlashes) between the rear sides of the teeth 20 on the third bush and the front sides of the teeth 18 on the third bush 12.

The operation described so far has been in the normal mode of operation, i.e. a low torque mode, when there is relatively little resistance to rotation of the output shaft 6 in the first direction. However, when the resistance to rotation in the first direction of the output shaft 6 increases to a relatively high level, the assembly switches to a high torque mode of operation as will now be described.

Referring to FIG. 2A, when the resistance to rotation of the output shaft 6 in the first direction increases, the second spring base 28 rotates at a higher rate in the first direction than the output shaft 6. As the second spring base 28 rotates relative to the output shaft 6, the angled channels 36 in the second spring base 28 act on the angled protrusions 34 on the output shaft 6. This drives the second spring base 28 in the longitudinal direction, along the rotational axis, towards the first spring base 26. The spring 30 between the spring bases 26,28 is compressed, which pushes the first spring base 26 in the longitudinal direction and such that the angled channels 38 in the first spring base 26 move along the second bush 10. The angled channels 38 in the first spring base 26 act on the angled protrusions 32 on the second bush 10, thereby driving the second bush 10 to rotate in the first direction.

Referring to FIG. 4A, the second bush 10 is rotated in the first direction, causing the front sides of the teeth 16 on the internal surface of the second bush 10 to push against the rear sides of the teeth 14 on the external surface of the first bush 8, leaving gaps (backlashes) 57 between the rear sides of the teeth 16 on the internal surface of the second bush 8 and the front sides of the teeth 14 on the external surface of the first bush 8. In turn, this moves the front sides of the teeth 56 on the internal surface of the first bush 8 to be against the rear sides of the teeth 52 on the external surface of the input shaft 4, leaving gaps 55 (backlashes) between the rear sides of the teeth 56 on the internal surface of the first bush 8 and the front sides of the teeth 52 on the input shaft 4. The first and second bushes 8,10 are therefore rotated ahead of the input shaft 4 in the first direction.

As shown in FIG. 4B, resistance to rotation of the output shaft 6 in the first direction results in the front sides of the teeth 22 on the external surface of the third bush 12 moving to positions against the rear sides of the teeth 24 on the output shaft 6. Also, the front sides of the teeth 18 on the input shaft 4 move to positions against the rear sides of the teeth 20 on the internal surface of the third bush 12.

Figure 5:
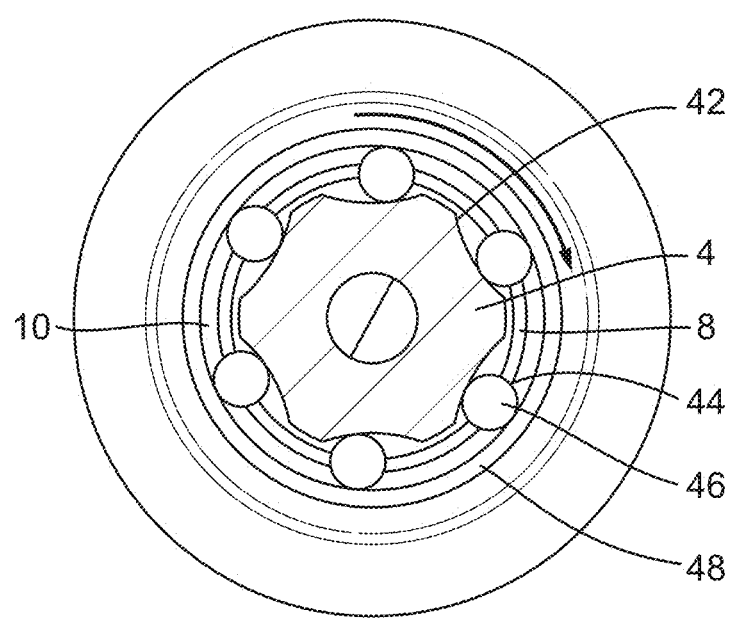
FIG. 5 shows a schematic of the assembly when viewed along the direction from the input shaft to the output shaft in the high torque mode.

As described in relation to FIG. 4A, in the high torque mode, the first and second bushes 8,10 are rotated ahead of the input shaft 4 in the first direction. As can be seen from FIGS. 2C and 2D, as the rollers 46 are located within the apertures 44 of the first bush 8, when the first bush 8 is rotated relative to the input shaft 4, the apertures in the first bush 8 force the rollers 46 up their respective ramps 42 on the input shaft 4 to the position shown in FIG. 5. The rollers 46 are therefore urged radially outwards and into contact with the casing 48. The casing 48 may be a static structure. The assembly may be configured such that the rollers 46 are urged or moved into engagement with the casing 48 with such force that the friction between the rollers 46 and casing 48 prevents or inhibits rotation of the rollers 46 relative to the casing 48 and hence prevents or inhibits rotation of the input shaft 4. Accordingly, this reduces the torque in the system and may help prevent or reduce damage.

When the resistance to rotation of the output shaft 6 in the first direction reduces back down to a normal or acceptable level (i.e. when the torque is reduced to a normal or acceptable level), the force on the spring 30 is relieved and the spring 30 is able to expand, forcing the second spring base 26 in the longitudinal direction towards the output shaft 6. The spring 30 therefore exerts a lower force on the first spring base 26 in a direction towards the second bush 10. The second bush 10 is therefore no longer biased ahead of the input shaft 4 in the first direction and so the input shaft 4, first bush 8 and second bush 10 are able to rotate back to the relative positions shown in FIG. 3B. The first bush 8 therefore rotates relative to the input shaft 4 back to the position shown in FIG. 2D, forcing the rollers 46 back down the ramp 42 so that they are no longer urged into the casing 48. The rollers 46 are therefore able to rotate about their axes and do not create significant friction with the casing 48. The input shaft 4 then returns to rotating as normal and the input shaft 4, third bush 12 and output shaft 6 are able to rotate back to the relative positions shown in FIG. 3C.

As described above, the assembly is configured to switch from the low torque mode to the high torque mode when a relatively high resistance to rotation of the output shaft 6 causes the spring 30 to be compressed (beyond its initial pre-loaded level). Similarly, the assembly may be configured to switch from the high torque mode to the low torque mode when a relatively low resistance to rotation of the output shaft 6 allows the spring 30 to relax. As such, the properties of the spring 30 may define the level of torque in the system at which the assembly switches between the two modes. The level of torque at which such switching occurs is therefore relatively easy to control in the embodiments disclosed herein. For example, the movement limiting members 40 may be configured to selectively allow adjustment of the distance between the spring bases 26,28 (prior to use of the assembly) and hence selectively adjust the level of compression (pre-loading) of the spring 30. This defines the level of resistance to compression of the spring 30 and hence the level of torque at which the assembly moves from the low toque mode to the high torque mode. The distance between the spring bases 28,30 may be selectively adjusted by known means, such as a threaded bolt 40 that may be screwed relative to the spring bases 26,28 so as to extend or contract the distance therebetween.

According to embodiments of the present disclosure, as torque transmission between an input shaft and an output shaft increases a drive bush is moved rotationally relative to the input shaft in a direction counter to a force of a biasing member (e.g. which may comprise a spring) by a helical engagement between the drive bush and the biasing member, the drive bush being coupled to at least one engagement member (e.g. via an intermediate bush having apertures 44) such that the rotational movement of the drive bush relative to the input shaft causes the at least one engagement member to move relative to the input shaft thereby moving the at least one engagement member into engagement with a casing.

Although the present disclosure has been described with reference to various embodiments, it will be understood by those skilled in the art that various changes in form and detail may be made without departing from the scope of the invention as set forth in the accompanying claims.

For example, although the engagement members 46 have been described as rollers, they may alternatively be non-rolling engagement members for engaging the casing 48. Alternatively, or additionally, rather than the engagement members 46 frictionally engaging the internal surface of the casing 48, the internal surface of the casing 48 may be configured with barriers that prevent circumferential movement of the engagement members 46 once they have been urged radially outwards.

Although the protrusions 32,34 have been described as being on the second bush 10 and output shaft 6 and the cooperating channels 36,38 have been described as being on the spring bases 26,28, it is contemplated that the protrusions 32,34 may be on the spring bases 26,28 and the cooperating channels may be on the second bush 10 and output shaft 6.

It is contemplated that the protrusions 32,34 may be on an internal surface of the component that it protrudes from and the cooperating channel 36,38 may be on an external surface of the component that it is in.

The assembly has been described as comprising the first and third bushes 8,12. These bushes allow the backlashes to be easily tailored and for the backlash between two sets of teeth to be relatively small. However, it is contemplated that the first and/or third bush 8,12 may be eliminated. In such embodiments, the teeth 56 on the first end of the input shaft 4 may directly engage the teeth 16 on the "third" bush 12. Alternatively, or additionally, the teeth 18 on the second end of the input shaft 4 may directly engage the teeth 22 on the output shaft 6.

Embodiments of the present disclosure enable the torque limiting assembly to be relatively small. For example, known assemblies comprising torsion bars are required to be relatively large since the torsion bar must be relatively long in order to obtain a suitable torsion angle. The torsion bar must also be accurately designed since the torque is dependent on the fourth power of the torsion bar diameter.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. A torque limiting assembly comprising:
an input shaft; an output shaft; a drive bush; a motion converter mechanism; a casing; and at least one engagement member for engaging the casing;
wherein the input shaft is coupled to the drive bush, and the drive bush is coupled to the output shaft by the motion converter mechanism such that, in a low torque mode, rotation of the input shaft drives rotation of the drive bush, motion converter mechanism and output shaft; and wherein the output shaft and the motion converter mechanism are coupled such that, in a high torque mode, rotation of the motion converter mechanism relative to the output shaft about an axis of rotation urges the motion converter mechanism in a direction along the axis of rotation, wherein the motion converter mechanism and drive bush are coupled such that when the motion converter mechanism is urged along said axis of rotation the motion converter mechanism rotates the drive bush relative to the input shaft; and wherein the engagement member is coupled to both the drive bush and the input shaft such that when the drive bush is rotated relative to the input shaft, the engagement member is moved or urged to engage the casing so as to prevent or inhibit rotation of the input shaft relative to the casing.

2. The assembly of claim 1, wherein one of the output shaft and the motion converter mechanism comprises a first protrusion and the other of the output shaft and motion converter mechanism comprises a first channel in which the protrusion is located, and wherein the first protrusion and first channel are arranged and configured such that, in the high torque mode, said rotation of the motion converter mechanism relative to the output shaft urges the motion converter mechanism in a direction along the axis of rotation.

3. The assembly of claim 1, wherein one of the drive bush and the motion converter mechanism comprises a second protrusion and the other of the drive bush and the motion converter mechanism comprises a second channel in which the second protrusion is located, and wherein the second protrusion and second channel are arranged and configured such that, in the high torque mode, when the motion converter mechanism is urged in a direction along said axis of rotation the motion converter mechanism rotates the drive bush relative to the input shaft.

4. The assembly of claim 2, wherein at least one of first channel and the first protrusion is elongated and extends both around and along the axis of rotation.

5. The assembly of claim 3, wherein at least one of the second channel and the second protrusion is elongated and extends both around and along the axis of rotation.

6. A torque limiting assembly comprising:
an input shaft; an output shaft; a drive bush; a motion converter mechanism; a casing; and at least one engagement member for engaging the casing;
wherein the input shaft is coupled to the drive bush, and the drive bush is coupled to the output shaft by the motion converter mechanism such that, in a low torque mode, rotation of the input shaft drives rotation of the drive bush, motion converter mechanism and output shaft; and
wherein the output shaft and the motion converter mechanism are coupled such that, in a high torque mode, rotation of the motion converter mechanism relative to the output shaft about an axis of rotation urges the motion converter mechanism in a direction along the axis of rotation, wherein the motion converter mechanism and drive bush are coupled such that when the motion converter mechanism is urged along said axis of rotation the motion converter mechanism rotates the drive bush relative to the input shaft; and wherein the engagement member is coupled to both the drive bush and the input shaft such that when the drive bush is rotated relative to the input shaft, the engagement member is moved or urged to engage the casing so as to prevent or inhibit rotation of the input shaft relative to the casing;
wherein the motion converter mechanism comprises a first portion engaged with the output shaft, a second portion engaged with the drive bush, and a resilient biasing member arranged between the first and second portions for resisting movement of the first and second portions towards each other along the axis of rotation, and thereby resisting rotation of the motion converter mechanism relative to the output shaft.

7. The assembly of claim 6, wherein the resilient biasing member is configured such that in the low torque mode it is compressed by a relatively low amount such that there is a relatively low amount of rotation of the motion converter mechanism relative to the output shaft; and the resilient biasing member is configured such that in the high torque mode it is compressed by a relatively high amount such that there is a relatively high amount of rotation of the motion converter mechanism relative to the output shaft.

8. The assembly of claim 6, wherein the resilient biasing member is arranged between the first and second portions for biasing the first and second portions away from each other along the axis of rotation, and wherein the assembly further comprises a movement limiting member for limiting the maximum amount of movement of the first and second portions away from each other.

9. The assembly of claim 8, wherein the movement limiting member is selectively adjustable for selectively adjusting the maximum amount of movement of the first and second portions away from each other.

10. The assembly of claim 6, wherein the resilient biasing member is a spring.

11. A torque limiting assembly comprising:
an input shaft; an output shaft; a drive bush; a motion converter mechanism; a casing; and at least one engagement member for engaging the casing;
wherein the input shaft is coupled to the drive bush, and the drive bush is coupled to the output shaft by the motion converter mechanism such that, in a low torque mode, rotation of the input shaft drives rotation of the drive bush, motion converter mechanism and output shaft; and
wherein the output shaft and the motion converter mechanism are coupled such that, in a high torque mode, rotation of the motion converter mechanism relative to the output shaft about an axis of rotation urges the motion converter mechanism in a direction along the axis of rotation, wherein the motion converter mechanism and drive bush are coupled such that when the motion converter mechanism is urged along said axis of rotation the motion converter mechanism rotates the drive bush relative to the input shaft; and wherein the engagement member is coupled to both the drive bush and the input shaft such that when the drive bush is rotated relative to the input shaft, the engagement member is moved or urged to engage the casing so as to prevent or inhibit rotation of the input shaft relative to the casing;
wherein the input shaft is coupled to the drive bush by an intermediate bush, wherein the input shaft comprises first teeth engaged with second teeth on the intermediate bush and the intermediate bush comprises third teeth engaged with fourth teeth on the drive bush.

12. The assembly of claim 11, wherein backlashes are arranged between the first and second teeth and/or between the third and fourth teeth, thereby allowing the input shaft to drive the drive bush in the low torque mode and allowing rotation of the drive bush relative to the input shaft in the high torque mode.

13. The assembly of claim 11, wherein the intermediate bush contacts the engagement member so that rotation of the intermediate bush causes a corresponding rotation of the engagement member.

14. The assembly of claim 1, wherein the input shaft comprises a portion in contact with the engagement member that is curved or otherwise ramped in a circumferential direction; and wherein the assembly is configured such that rotation of the drive bush relative to the input shaft, in the high torque mode, forces said engagement member along the curved or ramped surface and moves or urges the engagement member radially outwards to engage the casing so as to prevent or inhibit rotation of the input shaft relative to the casing.

15. The assembly of claim 1, wherein the engagement member is a roller.

16. The assembly of claim 1, wherein the axis of rotation is an axis of rotation of both the input and output shafts.

* * * * *